United States Patent
Uchihara et al.

(10) Patent No.: US 8,118,328 B2
(45) Date of Patent: Feb. 21, 2012

(54) POWER STEERING DEVICE

(75) Inventors: Masato Uchihara, Minokamo (JP); Yasuhiro Niwa, Kani (JP); Hideki Tanaka, Toki (JP); Masahide Shinbori, Shizuoka (JP)

(73) Assignees: Kayaba Industry Co., Ltd., Tokyo (JP); Yamaha Hatsudoki Kabushiki Kaisha, Shizuoka (JP)

( * ) Notice: Subject to any disclaimer, the term of this patent is extended or adjusted under 35 U.S.C. 154(b) by 170 days.

(21) Appl. No.: 12/461,493

(22) Filed: Aug. 13, 2009

(65) Prior Publication Data
US 2010/0108430 A1 May 6, 2010

(30) Foreign Application Priority Data
Nov. 4, 2008 (JP) ................................. 2008-282889

(51) Int. Cl.
*B62D 1/16* (2006.01)

(52) U.S. Cl. .................... 280/779; 180/444; 280/777

(58) Field of Classification Search ............... 180/444; 280/775, 777, 779, 780
See application file for complete search history.

(56) References Cited

U.S. PATENT DOCUMENTS

| 3,492,888 | A | * | 2/1970 | Nishimura et al. ............ 74/492 |
| 6,705,422 | B2 | * | 3/2004 | Maekawa ....................... 180/444 |
| 6,837,824 | B2 | | 1/2005 | Reimann et al. |
| 2003/0042065 | A1 | * | 3/2003 | Maekawa ....................... 180/444 |
| 2005/0236222 | A1 | * | 10/2005 | Chikaraishi ................... 180/444 |
| 2006/0086559 | A1 | * | 4/2006 | Segawa et al. ................. 180/444 |
| 2007/0193383 | A1 | * | 8/2007 | Toshima et al. ............ 74/388 PS |

FOREIGN PATENT DOCUMENTS

JP 2004-231011 A 8/2004

* cited by examiner

*Primary Examiner* — Paul N Dickson
*Assistant Examiner* — Wesley Potter
(74) *Attorney, Agent, or Firm* — Rabin & Berdo, P.C.

(57) ABSTRACT

A power steering device for a vehicle includes an input shaft (1) linked to a steering wheel, an output shaft (2) linked to a vehicle wheel, a torsion bar (3) that connects the input shaft (1) to the output shaft (2), and a cylindrical member (13) supported by a housing (12) that is fastened to a vehicle body. The input shaft (1) includes a first input shaft (4) that is inserted into the cylindrical member (13), supported rotatably by the cylindrical member (13), and linked to the steering wheel, and a second input shaft (5) that connects the first input shaft (4) to the torsion bar (3). A connection portion between the first input shaft (4) and the second input shaft (5) is constituted such that a rotation of the first input shaft (4) is transmitted to the second input shaft (5) and the first input shaft (4) is free to move in an axial direction relative to the second input shaft (5).

6 Claims, 4 Drawing Sheets

POWER STEERING DEVICE

TECHNICAL FIELD OF THE INVENTION

This invention relates to a power steering device.

DESCRIPTION OF RELATED ART

A vehicle may be installed with a power steering device that assists a steering force applied to a steering wheel by a driver (see JP2004-231011A).

In a power steering device for a vehicle, an input shaft and a column shaft linked to the steering wheel may be serration-connected such that a steering torque from the steering wheel is applied to the input shaft, and a serration connection portion connecting the input shaft and the column shaft may be fixed using a bolt to prevent dislocation of the serration connection portion in an axial direction.

SUMMARY OF THE INVENTION

When axial direction movement of the serration connection portion between the input shaft and the column shaft is restricted by a bolt in this manner, an axial direction load from the steering wheel is also transmitted directly to the input shaft via the column shaft.

In particular, when the vehicle travels along irregular terrain so as to vibrate vertically, the weight of the driver may be applied to the steering wheel such that a corresponding load is transmitted to the input shaft via the column shaft.

When an axial direction load from the steering wheel is transmitted to the input shaft in addition to the steering torque of the steering wheel, the axial direction load may cause a disturbance to a torque sensor for detecting the steering torque.

This invention has been designed in consideration of the problems described above, and it is an object thereof to achieve an improvement in the precision of a torque sensor in a power steering device.

In order to achieve above object, this invention provides a power steering device for a vehicle. The power steering device comprises an input shaft linked to a steering wheel, an output shaft linked to a vehicle wheel, a torsion bar that connects the input shaft to the output shaft, and a cylindrical member supported by a housing that is fastened to a vehicle body, wherein the input shaft includes a first input shaft that is inserted into the cylindrical member, supported rotatably by the cylindrical member, and linked to the steering wheel, and a second input shaft that connects the first input shaft to the torsion bar, and a connection portion between the first input shaft and the second input shaft is constituted such that a rotation of the first input shaft is transmitted to the second input shaft and the first input shaft is free to move in an axial direction relative to the second input shaft.

PREFERRED EMBODIMENTS OF THE INVENTION

Embodiments of this invention will now be described with reference to the drawings.

This invention relates to a power steering device for a vehicle, which assists a steering force applied to a steering wheel by a driver. In the following embodiment, a power steering device installed in an irregular terrain vehicle such as a buggy which travels along mountainous terrain or other unleveled irregular terrain will be described.

First Embodiment

Figure 1:
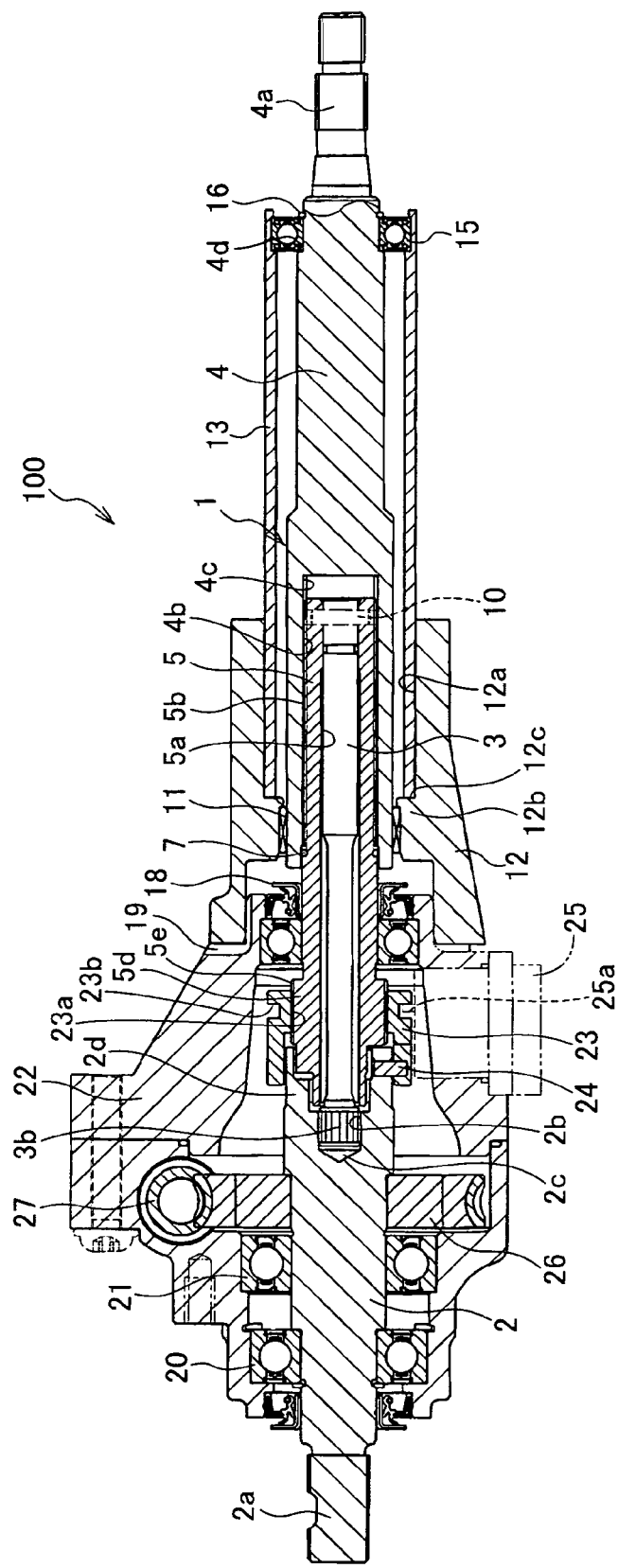
FIG. 1 is a sectional view showing a power steering device according to a first embodiment of this invention.
Figure 2:
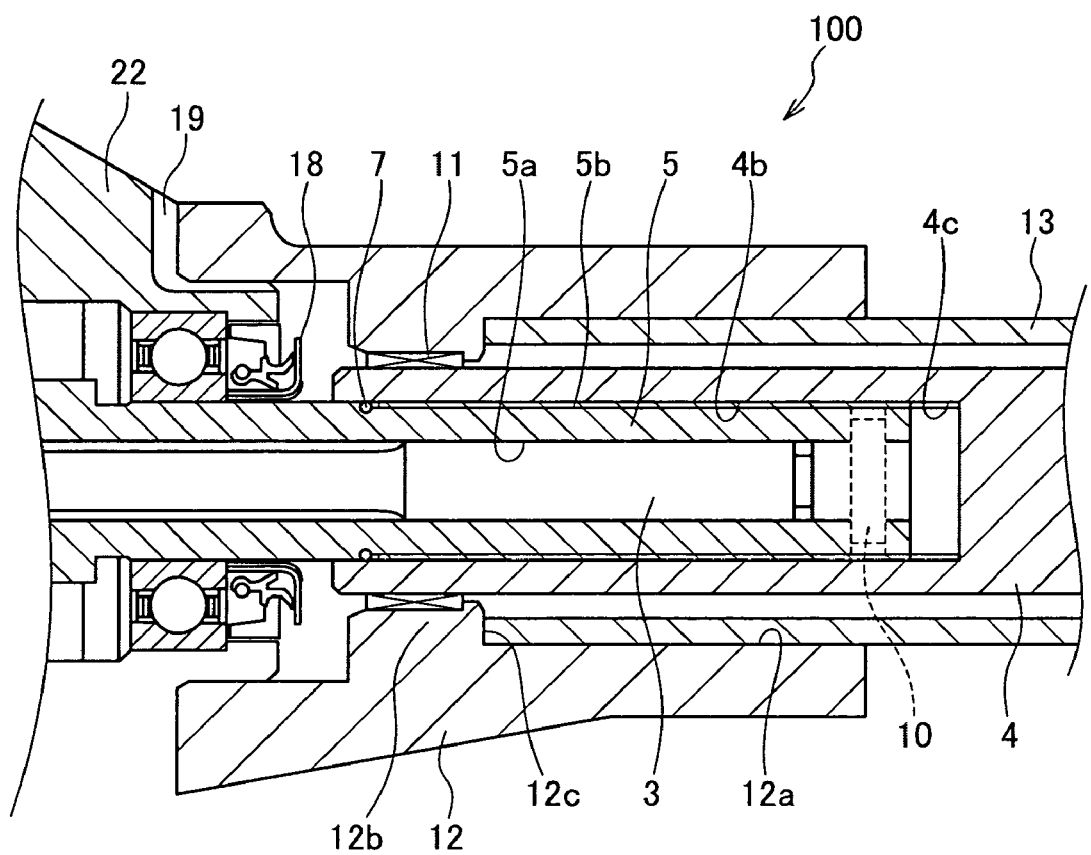
FIG. 2 is an enlarged sectional view showing the main parts of the power steering device according to the first embodiment of this invention.

Referring to FIGS. 1 and 2, a power steering device 100 for an irregular terrain vehicle (to be referred to hereafter simply as "power steering device 100") according to a first embodiment of this invention will be described.

The power steering device 100 comprises an input shaft 1 linked to a steering wheel (not shown), and an output shaft 2 linked to a vehicle wheel (not shown).

The input shaft 1 is directly connected to the steering wheel. The output shaft 2 is connected to the vehicle wheel via a link mechanism (not shown) such as a rod.

The input shaft 1 and output shaft 2 are connected substantially coaxially by a torsion bar 3 so as to rotate relatively in accordance with the torsion of the torsion bar 3.

The input shaft 1 is constituted by a first input shaft 4 linked to the steering wheel and a second input shaft 5 linked to the torsion bar 3, wherein the first input shaft 4 and second input shaft 5 are connected substantially coaxially.

By forming the input shaft 1 from the two shafts 4, 5, only the first input shaft 4 linked to the steering wheel need be replaced when the input shaft 4 is deformed or the like, and there is no need to replace the entire input shaft 1. As a result, a large reduction in the maintenance load and a reduction in the cost of repair and replacement can be achieved.

A fastening portion 4a to which the steering wheel is fastened is formed on one end of the first input shaft 4, and a hollow portion 4c having a spline 4b on its inner periphery is formed on the other end.

The second input shaft 5 is formed in a cylindrical shape, and the torsion bar 3 is inserted into a through hole 5a in the second input shaft 5. One end of the torsion bar 3 is connected to the second input shaft 5 by a connecting pin 10.

Further, the second input shaft 5 is inserted into the hollow portion 4c of the first input shaft 4. A spline 5b is formed on an outer periphery of the second input shaft 5 in a position corresponding to the spline 4b on the inner periphery of the hollow portion 4c of the first input shaft 4.

The first input shaft 4 and second input shaft 5 are spline-connected by screwing together the spline 4b and the spline 5b. Thus, a connection portion between the first input shaft 4 and second input shaft 5 is a spline connection by which a rotation of the first input shaft 4 is transmitted to the second input shaft 5 and the first input shaft 4 is free to move in the axial direction relative to the second input shaft 5. In other words, only a rotary force is transmitted from the first input shaft 4 to the second input shaft 5, and an axial direction load is not transmitted.

To reduce rotation direction play in the connection portion between the first input shaft 4 and second input shaft 5 in order to improve the efficiency with which the rotary force is transmitted from the first input shaft 4 to the second input shaft 5, a lubricant having a high degree of viscosity is sealed in the connection portion. An O ring 7 serving as a seal member for preventing leakage of the lubricant from the connection portion is provided in a compressed state in the vicinity of an opening portion of the hollow portion 4c of the first input shaft 4 between the inner periphery of the hollow portion 4c and the outer periphery of the second input shaft 5. More specifically, the O ring 7 is fitted into an annular groove formed in the outer periphery of the second input shaft 5.

Further, to improve the efficiency with which the rotary force is transmitted from the first input shaft 4 to the second input shaft 5, the spline 4b of the first input shaft 4 and the spline 5b of the second input shaft 5 are preferably constituted by involute splines. However, the spline 5b is not limited to an involute spline, and may be an angular spline or the like.

A fastening portion 2a to which the rod or other link mechanism is fastened is coupled to one end of the output shaft 2, and a hollow portion 2c having a serration 2b on its inner periphery is formed at the other end.

A serration 3b is formed on another end portion of the torsion bar 3 projecting from the second input shaft 5. The other end portion of the torsion bar 3 is inserted into the hollow portion 2c of the output shaft 2 such that the serration 3b is screwed to the serration 2b of the output shaft 2. Thus, the torsion bar 3 and the output shaft 2 are serration-coupled.

A hollow portion 4c side end portion of the first input shaft 4 is supported rotatably by a housing 12, which is fastened to a vehicle body, via a bush 11, and the fastening portion 4a side extends so as to project from the housing 12.

One end side of a cylindrical member 13 penetrated by the first input shaft 4 is press-fitted into an opening portion 12a of the housing 12. The cylindrical member 13 is supported by the housing 12 so as to be disposed substantially coaxially with the output shaft 2.

A reduced diameter portion 12b is formed on an inner periphery of the housing 12, and the cylindrical member 13 is disposed such that an end portion thereof contacts a step portion 12c of the reduced diameter portion 12b. The bush 11 is press-fitted into an inner periphery of the reduced diameter portion 12b.

A steering wheel side end portion of the first input shaft 4 is supported rotatably by the cylindrical member 13 via a bearing 15.

An outer peripheral side of the bearing 15 is caulked to an inner periphery of the cylindrical member 13. Further, an inner peripheral side of the bearing 15 is latched to an annular step portion 4d formed on the outer periphery of the first input shaft 4 and latched to a snap ring 16 fitted into an annular groove formed in the outer periphery of the first input shaft 4. Thus, the bearing 15 is held between the outer periphery of the first input shaft 4 and the inner periphery of the cylindrical member 13.

The first input shaft 4 is supported rotatably by the cylindrical member 13 via the bearing 15 and positioned substantially coaxially with the output shaft 2 by the cylindrical member 13 and the bearing 15. Further, the second input shaft 5 is connected substantially coaxially to the output shaft 2 via the torsion bar 3. Hence, the first input shaft 4 and second input shaft 5 are connected substantially coaxially.

Since the first input shaft 4 is supported by the cylindrical member 13 via the bearing 15, the first input shaft 4 is prevented from dislocating from the second input shaft 5. Furthermore, when an axial direction load from the steering wheel is transmitted to the first input shaft 4 via a steering shaft, the axial direction load is transmitted to the housing 12 via the bearing 15 and the cylindrical member 13 rather than being transmitted to the spline-connected second input shaft 5. Hence, axial direction movement of the first input shaft 4 is restricted by the cylindrical member 13.

The output shaft 2 is supported rotatably by a gear box 22 via a bearing 20 and a bearing 21. The gear box 22 is coupled to the housing 12 by a fastening member (not shown).

The irregular terrain vehicle installed with the power steering device 100 may travel in a condition where approximately half of the vehicle body is submerged in water, and in such a case, muddy water may infiltrate the housing 12 and the gear box 22. Therefore, a gap 19 that opens to the outside is provided between the housing 12 and the gear box 22. Muddy water that infiltrates the housing 12 and the gear box 22 is discharged to the outside through this gap 19.

By providing the gap 19 between the housing 12 and the gear box 22, muddy water can be discharged, but muddy water may be led into the housing 12 and the gear box 22 through the gap 19. However, the O ring 7 is provided between the first input shaft 4 and the second input shaft 5, and therefore muddy water is prevented from infiltrating the connection portion between the first input shaft 4 and second input shaft 5. Hence, the O ring 7 not only functions to prevent lubricant leakage from the connection portion, but also to prevent muddy water from infiltrating the connection portion.

Further, a sealing material 18 is provided in an opening portion of the gear box 22 facing the gap 19, and therefore muddy water is prevented from infiltrating the gear box 22 through the gap 19.

A cylindrical sleeve 23 is provided on the outer periphery of both the second input shaft 5 and the output shaft 2.

A helical spline 23a that extends in a diagonal direction relative to the axis is formed around the entire inner periphery of the sleeve 23 on the second input shaft 5 side. Further, a groove extending in the axial direction is formed in the inner periphery of the sleeve 23 on the output shaft 2 side.

Meanwhile, an increased diameter portion 5d is formed on the outer periphery of the second input shaft 5, and a helical spline 5e extending in a diagonal direction to the axis is formed around the entire circumference of the increased diameter portion 5d. The second input shaft 5 is engaged to the sleeve 23 by screwing the helical spline 23a of the sleeve 23 to the helical spline 5e of the second input shaft 5.

Further, an increased diameter portion 2d is formed on the outer periphery of the output shaft 2, and a pin 24 is provided in the increased diameter portion 2d. The pin 24 engages slidably with the groove formed in the sleeve 23.

By forming the sleeve 23 in this manner, when a steering torque is applied to the input shaft 1 via the steering wheel such that the input shaft 1 and the output shaft 2 rotate relatively about an identical central axis due to elastic torsional deformation of the torsion bar 3, the sleeve 23 slides along the pin 24 of the output shaft 2 in the axial direction by a length determined according to the incline of the helical splines 5e, 23a.

An annular groove 23b is formed in the outer periphery of the sleeve 23, and a detection lever 25a of a torque sensor 25 is engaged with the groove 23b. Thus, the detection lever 25a is operated in accordance with the slide amount of the sleeve 23, into which the torsion of the torsion bar 3 (the relative rotation amount between the input shaft 1 and the output shaft 2) is converted, and as a result, the torsion of the torsion bar 3 is detected by the torque sensor 25. A magnitude and a direction of the steering torque are then calculated from the torsion of the torsion bar 3 detected in this manner.

An annular worm wheel 26 is press-fitted onto the outer periphery of the output shaft 2. A worm gear 27 coupled to an output shaft of an electric motor (not shown) is meshed to the worm wheel 26.

The electric motor is driven on the basis of the magnitude and direction of the steering torque calculated on the basis of the detection result of the torque sensor 25, whereby an assist force for assisting a steering force applied to the steering wheel by the driver is applied to the output shaft 2 via the worm gear 27 and the worm wheel 26.

According to this embodiment, the following actions and effects are obtained.

As described above, the electric motor applies an assist force to the output shaft 2 on the basis of the torsion of the torsion bar 3, i.e. the relative rotation amount between the input shaft 1 and the output shaft 2. Accordingly, the steering torque input into the first input shaft 4 from the steering wheel must be transmitted without loss to the second input shaft 5 connected to the torsion bar 3. Moreover, an axial direction load transmitted to the first input shaft 4 from the steering wheel due to the weight of the driver or the like may cause a disturbance during the detection performed by the torque sensor 25, and it is therefore undesirable for this axial direction load to be transmitted to the second input shaft 5.

In the power steering device 100, the connection portion between the first input shaft 4 and the second input shaft 5 is a spline connection, and a lubricant having a high degree of viscosity is sealed in the connection portion by the O ring 7 to prevent leakage thereof. Hence, the steering torque input into the first input shaft 4 from the steering wheel is transmitted efficiently to the second input shaft 5.

Further, the first input shaft 4 and second input shaft 5 are spline-connected and not fixed in the axial direction, and therefore, when an axial direction load is transmitted to the first input shaft 4 from the steering wheel, the load is transmitted to the housing 12 via the bearing 15 and the cylindrical member 13 rather than being transmitted to the second input shaft 5. Hence, an axial direction load transmitted to the first input shaft 4 from the steering wheel is prevented from causing a disturbance during the detection performed by the torque sensor 25.

Thus, a steering torque transmitted to the first input shaft 4 from the steering wheel is transmitted to the second input shaft 5, whereas an axial direction load transmitted to the input shaft 4 from the steering wheel is not transmitted to the second input shaft 5. Therefore, an improvement in the precision of the torque sensor 25 is achieved even in an environment where the vehicle vibrates vertically while traveling over irregular terrain such that an axial direction load is transmitted to the first input shaft 4 from the steering wheel.

Second Embodiment

Figure 3:
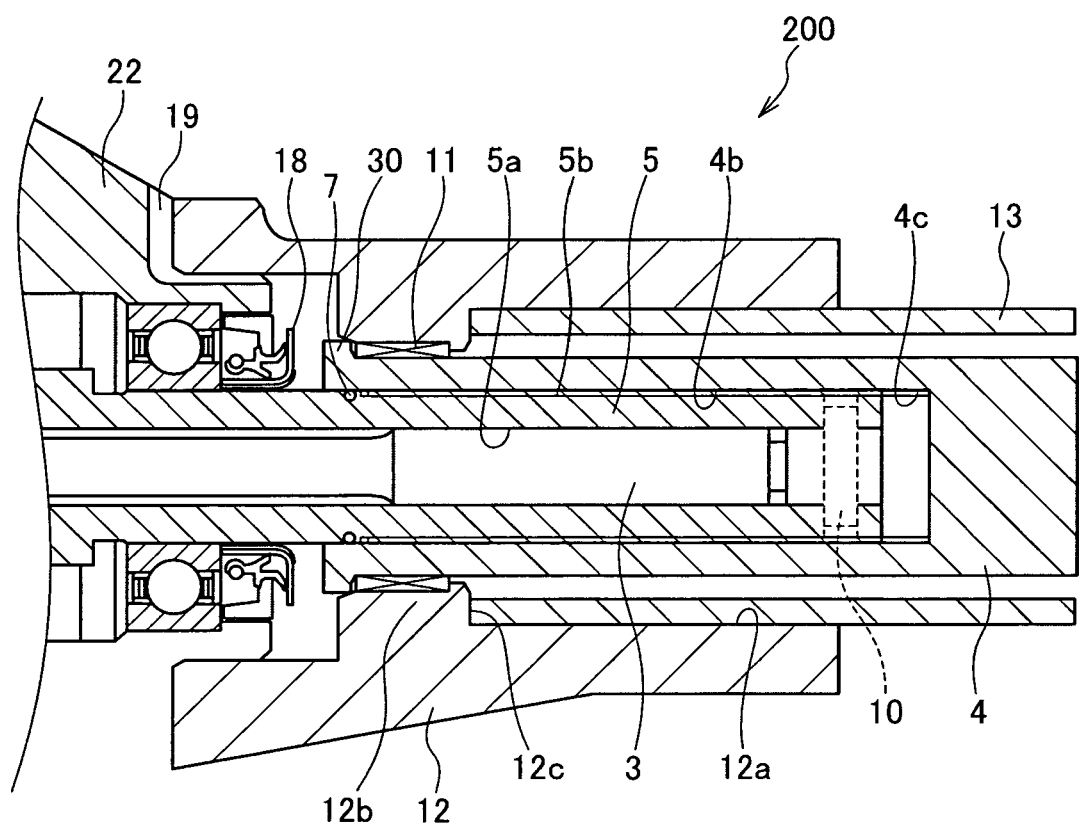
FIG. 3 is an enlarged sectional view showing the main parts of a power steering device according to a second embodiment of this invention.
Figure 4:
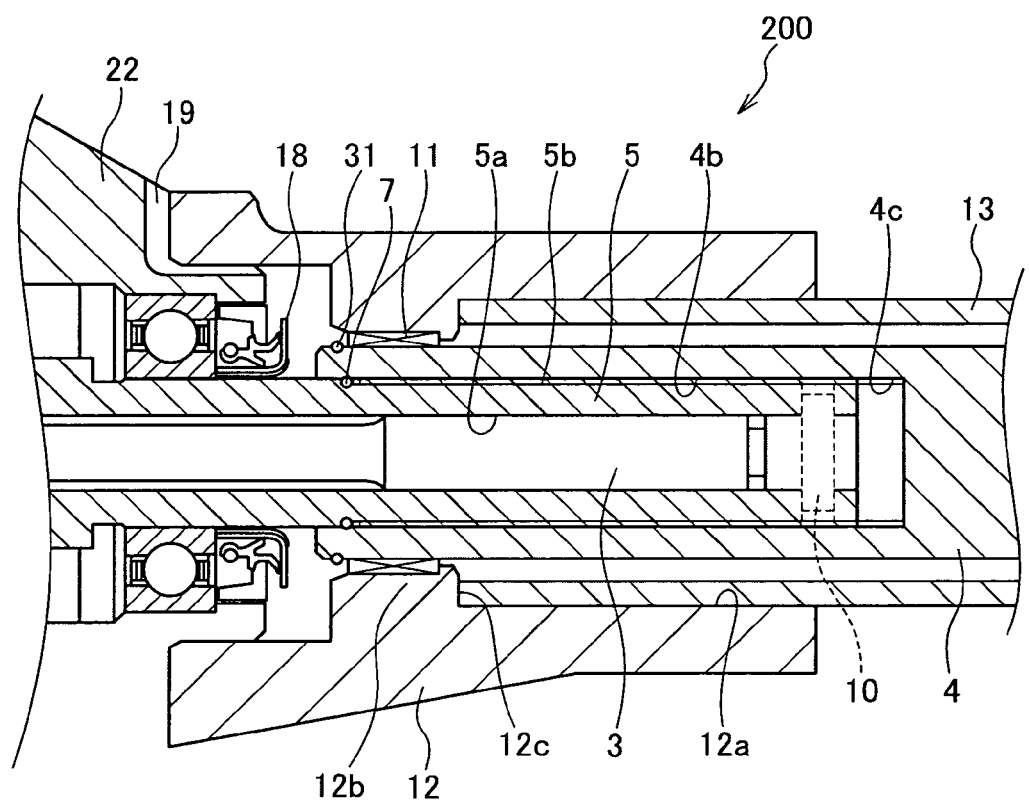
FIG. 4 is an enlarged sectional view showing another aspect of the power steering device according to the second embodiment of this invention.

Referring to FIGS. 3 and 4, a power steering device 200 for an irregular terrain vehicle (to be referred to hereafter simply as "power steering device 200") according to a second embodiment of this invention will be described. FIGS. 3 and 4 are enlarged sectional views showing the main parts of the power steering device 200.

The following description will focus on differences with the first embodiment. Accordingly, identical constitutions to the first embodiment have been allocated identical reference symbols, and description thereof has been omitted.

As described above, the first input shaft 4 and second input shaft 5 are spline-connected such that the first input shaft 4 is free to move in the axial direction relative to the second input shaft 5. Nevertheless, the first input shaft 4 is supported by the cylindrical member 13 via the bearing 15, and is therefore prevented from dislocating from the second input shaft 5. Hence, the first input shaft 4 and second input shaft 5 are spline-connected, but the steering wheel is prevented from dislocating in the axial direction.

However, the power steering device 200 is installed in an irregular terrain vehicle, and in cases such as when the vehicle vibrates greatly while traveling over irregular terrain and when the vehicle jumps unintentionally such that a large reaction is received after the vehicle lands, a large load is applied to the steering wheel by the driver in a dislocating direction. In this situation, it may be impossible to prevent the first input shaft 4 from dislocating from the second input shaft 5 with only the structure constituted by the bearing 15 and the cylindrical member 13.

Hence, the first input shaft 4 of the power steering device 200 is provided with a latch member latched to the housing 12 to prevent dislocation from the second input shaft 5 reliably.

More specifically, as shown in FIG. 3, the latch member is a projecting portion 30 that stands upright on the outer periphery of the first input shaft 4. The projecting portion 30 may take an annular shape extending around the entire circumference of the first input shaft 4, or may be formed on only a part of the outer periphery.

By providing the projecting portion 30 on the outer periphery of the first input shaft 4 in this manner, the projecting portion 30 is latched to the reduced diameter portion 12b of the housing 12 such that when the first input shaft 4 moves in a dislocating direction from the second input shaft 5, further movement of the first input shaft 4 is restricted, and as a result, dislocation of the first input shaft 4 is prevented reliably. Hence, axial direction dislocation of the steering wheel can be prevented reliably. It should be noted that the projecting portion 30 may be latched to the bush 11 that is press-fitted into the inner periphery of the reduced diameter portion 12b of the housing 12.

In another embodiment of the latch member, as shown in FIG. 4, an annular wire ring 31 may be provided on the outer periphery of the first input shaft 4. The wire ring 31 is fitted into an annular groove formed in the outer periphery of the first input shaft 4. Identical actions and effects to those exhibited by the projecting portion 30 are obtained when the latch member is constituted in this manner. Furthermore, the wire ring 31 is constituted by a separate member to the first input shaft 4, and therefore manufacture and assembly of the power steering device 200 can be performed easily.

This invention is not limited to the embodiments described above, and may naturally be subjected to various modifications within the scope of the technical spirit thereof.

For example, in the above embodiments, a power steering device installed in an irregular terrain vehicle was described, but this invention may also be applied to a power steering device installed in another type of vehicle.

What is claimed is:

1. A power steering device for a vehicle, comprising:
an input shaft linked to a steering wheel;
an output shaft linked to a vehicle wheel;
a torsion bar that connects the input shaft to the output shaft; and
a cylindrical member supported by a housing that is fastened to a vehicle body;
the input shaft including:
a first input shaft that is inserted into the cylindrical member, supported rotatably by the cylindrical member via a bearing, and linked to the steering wheel;
a second input shaft that connects the first input shaft to the torsion bar;

a latch member provided on the first input shaft and directly latched to the housing; and a connection portion between the first input shaft and the second input shaft that is constituted such that a rotation of the first input shaft is transmitted to the second input shaft and the first input shaft is free to move in an axial direction relative to the second input shaft.

2. The power steering device as defined in claim 1, wherein a seal member is provided between the first input shaft and the second input shaft.

3. The power steering device as defined in claim 1, wherein the first input shaft and the second input shaft are spline-connected.

4. The power steering device as defined in claim 1, wherein the latch member is a projecting portion that stands upright on an outer periphery of the first input shaft.

5. The power steering device as defined in claim 1, wherein the latch member is a wire ring provided on an outer periphery of the first input shaft.

6. The power steering device as defined in claim 1, further comprising a gear box that supports the output shaft rotatably via a bearing, wherein a gap is formed between the housing and the gear box.

* * * * *